(12) United States Patent
Desjoyeaux et al.

(10) Patent No.: US 12,090,741 B2
(45) Date of Patent: Sep. 17, 2024

(54) STRUCTURAL AND/OR ACOUSTIC PANEL OF A NACELLE OF AN AIRCRAFT PROPULSION ASSEMBLY AND RELATED MANUFACTURING METHOD

(71) Applicants: Safran Nacelles, Gonfreville L'Orcher (FR); Safran Ceramics, Le Haillan (FR)

(72) Inventors: Bertrand Desjoyeaux, Moissy Cramayel (FR); Davi Silva De Vasconcellos, Moissy Cramayel (FR); Florent Bouillon, Moissy Cramayel (FR); Arnaud Delehouze, Moissy Cramayel (FR)

(73) Assignees: Safran Nacelles, Gonfreville L'Orcher (FR); Safran Ceramics, Le Haillan (FR)

( * ) Notice: Subject to any disclaimer, the term of this patent is extended or adjusted under 35 U.S.C. 154(b) by 799 days.

(21) Appl. No.: 16/800,286

(22) Filed: Feb. 25, 2020

(65) Prior Publication Data
US 2020/0300196 A1    Sep. 24, 2020

Related U.S. Application Data

(63) Continuation of application No. PCT/FR2018/052090, filed on Aug. 22, 2018.

(30) Foreign Application Priority Data

Aug. 25, 2017  (FR) .................................. 17/57886

(51) Int. Cl.
*B32B 5/02*   (2006.01)
*B32B 3/12*   (2006.01)
*F02K 1/82*   (2006.01)

(52) U.S. Cl.
CPC ................ *B32B 5/024* (2013.01); *B32B 3/12* (2013.01); *F02K 1/827* (2013.01);
(Continued)

(58) Field of Classification Search
CPC ... F02K 1/827; F02K 1/44; B32B 3/12; B32B 5/024; B32B 2250/03; B32B 2262/105; B32B 2307/102; B32B 2605/18
(Continued)

(56) References Cited

U.S. PATENT DOCUMENTS 3,542,152 A * 11/1970 Oxx, Jr. ................. B64D 33/02
                                                415/200
3,617,416 A * 11/1971 Kromrey ............ B29D 99/0089
                                                156/173
(Continued)

FOREIGN PATENT DOCUMENTS

DE   102014011775   2/2016
FR   3039148        1/2017
(Continued)

OTHER PUBLICATIONS

English translation of JP-H10146904-A, accessed Dec. 7, 2022 in USPTO Search tool (Year: 1998).*
(Continued)

*Primary Examiner* — Jeremy A Luks
(74) *Attorney, Agent, or Firm* — Burris Law, PLLC

(57) ABSTRACT

A panel for a nacelle of an aircraft propulsion assembly includes two skins and a cell structure provided with transverse partitions defining cells. The cell structure includes folds with at least one central part forming at least one part of at least one transverse partition and at least one peripheral part extending along at least one of the skins. A nacelle with such a panel is provided, as well as a method for manufacturing such a panel.

9 Claims, 9 Drawing Sheets

(52) U.S. Cl.
CPC ..... *B32B 2250/03* (2013.01); *B32B 2262/105* (2013.01); *B32B 2307/102* (2013.01); *B32B 2605/18* (2013.01)

(58) Field of Classification Search
USPC ........................................................ 181/292
See application file for complete search history.

(56) References Cited

U.S. PATENT DOCUMENTS

| | | | | |
|---|---|---|---|---|
| 3,734,234 | A * | 5/1973 | Wirt | F02K 1/827 428/116 |
| 4,832,999 | A * | 5/1989 | Sweet | F28F 3/12 428/116 |
| 5,116,688 | A * | 5/1992 | Minamida | B32B 3/28 428/603 |
| 5,399,221 | A * | 3/1995 | Casella | B29C 65/18 428/118 |
| 5,549,773 | A * | 8/1996 | Henderson | B29C 65/30 428/116 |
| 5,894,044 | A * | 4/1999 | Norcom | B31D 3/0246 428/116 |
| 6,245,407 | B1 * | 6/2001 | Wang | B29D 99/0089 428/116 |
| 7,401,682 | B2 * | 7/2008 | Proscia | F02K 1/827 239/265.17 |
| 7,541,085 | B2 * | 6/2009 | Burdon | B31D 3/0207 220/666 |
| 8,671,693 | B2 * | 3/2014 | Straza | B32B 7/12 60/226.3 |
| 10,309,305 | B2 * | 6/2019 | Biset | G10K 11/172 |
| 10,316,755 | B2 * | 6/2019 | Biset | F02C 7/24 |
| 2005/0263346 | A1 * | 12/2005 | Nishimura | G10K 11/16 181/290 |
| 2009/0263627 | A1 * | 10/2009 | Hand | F02K 1/822 427/372.2 |
| 2012/0090693 | A1 * | 4/2012 | Chelin | F02C 7/047 137/15.1 |
| 2015/0367953 | A1 * | 12/2015 | Yu | B64D 33/06 181/290 |
| 2016/0039164 | A1 | 2/2016 | Tuczek | |
| 2019/0024589 | A1 * | 1/2019 | Bowen | E04B 1/86 |

FOREIGN PATENT DOCUMENTS

| | | | |
|---|---|---|---|
| JP | H106418 A | * | 1/1998 |
| JP | H10146904 A | * | 6/1998 |
| WO | 2014/200499 | | 12/2014 |
| WO | 2017/103390 | | 6/2017 |

OTHER PUBLICATIONS

International Search Report for International Application PCT/FR2018/052090, mailed Nov. 9, 2018.

* cited by examiner

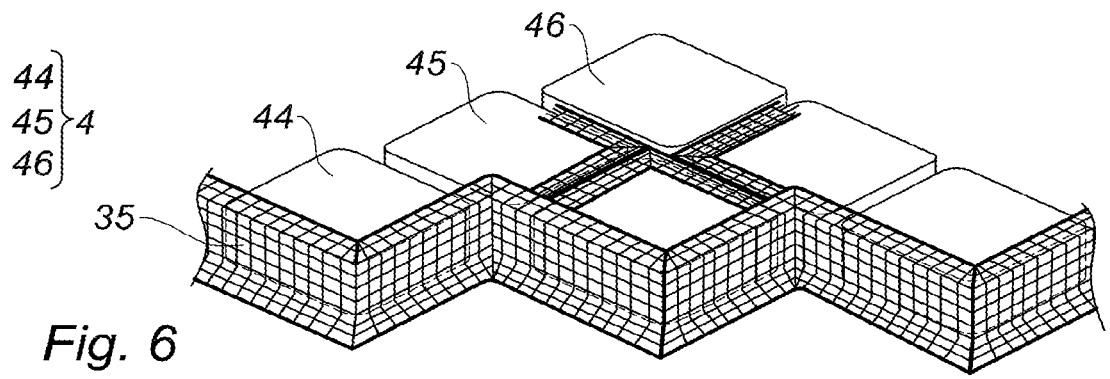
Fig. 6
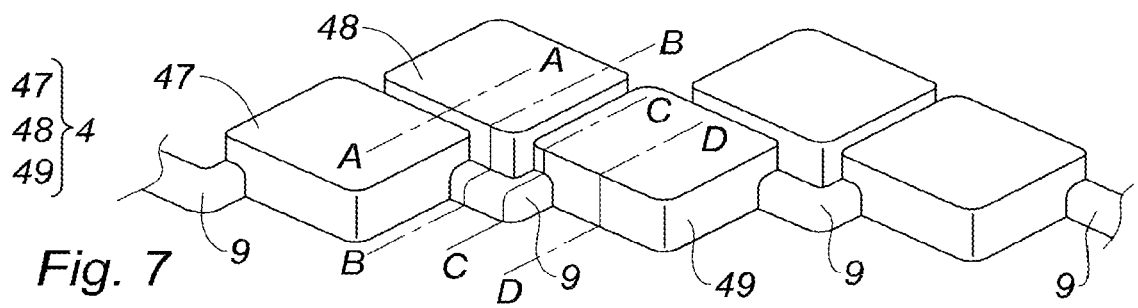
Fig. 7
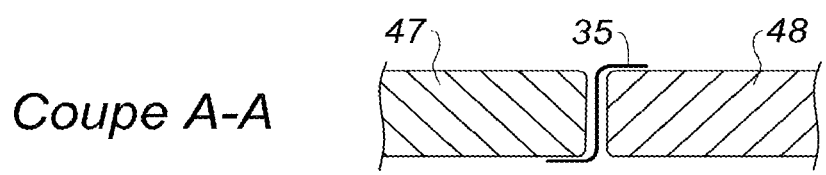
Coupe A-A    Fig. 8
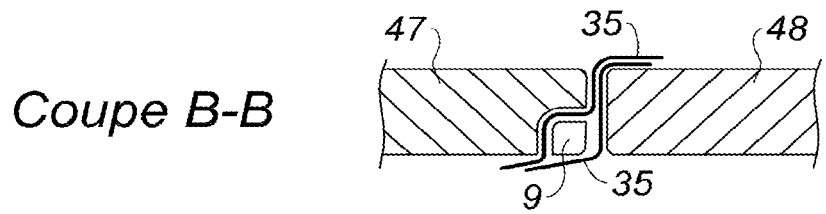
Coupe B-B    Fig. 9
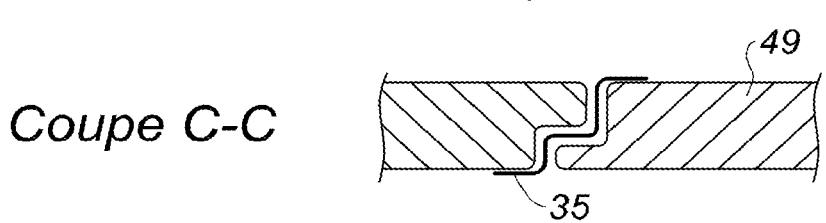
Coupe C-C    Fig. 10
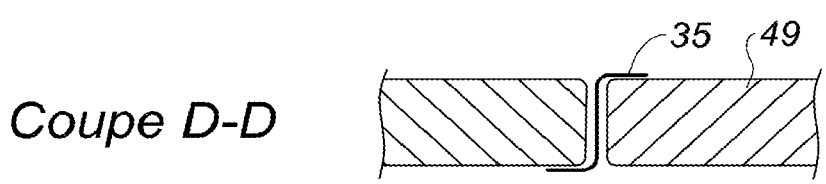
Coupe D-D    Fig. 11

STRUCTURAL AND/OR ACOUSTIC PANEL OF A NACELLE OF AN AIRCRAFT PROPULSION ASSEMBLY AND RELATED MANUFACTURING METHOD

CROSS-REFERENCE TO RELATED APPLICATIONS

This application is a continuation of International Application No. PCT/FR2018/052090, filed on Aug. 22, 2018, which claims priority to and the benefit of FR 17/57886 filed on Aug. 25, 2017. The disclosures of the above applications are incorporated herein by reference.

FIELD

The present disclosure relates to the field of nacelles of aircraft propulsion assemblies. This propulsion assembly may comprise a turbojet engine or a turbomachine. This aircraft may be an airplane or a helicopter.

BACKGROUND

The statements in this section merely provide background information related to the present disclosure and may not constitute prior art.

More specifically, the present disclosure concerns a structural and/or acoustic panel, for example for an exhaust nozzle component such as an ejection cone or a primary nozzle of an aircraft turbojet engine nacelle.

In this field, it is known to implement structural panels commonly called "sandwich panels". Such a panel typically comprises two skins and an intermediate structure connecting the two skins. Typically, the intermediate structure consists of transverse partition walls contributing to the structural holding of the panel, by providing the connection between the two skins and supporting mechanical and thermal stresses. Such an intermediate structure allows reducing the overall mass of the panel.

Such a panel can further have an acoustic treatment function in order to attenuate the noise generated by the propulsion assembly. For this purpose, the transverse partition walls of the intermediate structure are arranged so as to delimit cells. One of the skins, exposed to the noise source, is typically pierced so that the cells form Helmholtz cavities.

The document FR 3 039 148 A1 describes such a panel as well as a method for manufacturing such a panel.

Nonetheless, the structural panels known in the state of the prior art, intended for aeronautical applications, in particular for exhaust nozzles, are relatively expensive in particular because of the specific methods for manufacturing the used materials (for example, superalloys or ceramic composites).

SUMMARY

This section provides a general summary of the disclosure and is not a comprehensive disclosure of its full scope or all of its features.

The present disclosure provides a panel for a nacelle of an aircraft propulsion assembly offering good mechanical and structural performance at a lower cost compared to structural panels known in the prior art.

To this end, the disclosure relates to a panel for a nacelle of an aircraft propulsion assembly, comprising two skins and a cellular structure between these two skins, the cellular structure comprising transverse partition walls delimiting cells.

In some variations, the skins can be fibrous skins. For example, the skins can comprise fibers of a ceramic material.

According to the disclosure, this panel comprises folds each comprising:
- at least one central portion extending transversely so as to form at least one portion of at least one transverse partition wall, and
- at least one peripheral portion extending along at least one of the skins.

In this document, the expressions "central portion" and "peripheral portion" relate to the location of the concerned portion in the panel. Thus, a portion of a fold which extends (or which is intended to extend) transversely between the two skins is called central, while a portion of a fold which extends (or which is intended to extend) along a skin is called peripheral.

The presence of folds thus arranged reinforces the structural holding of the panel relative to a panel of the prior art in which the skins are connected to each other by simple transverse partition walls or folds extending transversely and comprising no portion extending along one or both skins.

Folds thus arranged allow the cells to be formed and to make them independent of each other, at least acoustically, without additional parts or components. In addition, the mass of the panel is reduced since it is not necessary for the folds to completely surround each cell.

In addition, the manufacture of such a panel is relatively economical and easy, and the arrangement of the folds can be achieved by draping textile folds.

Thus, the folds can be textile folds.

In one variation, the folds can be fibrous folds.

Such fibrous folds may comprise fibers of a ceramic material.

The fibers can be mineral, organic or ceramic.

The inventors have found that fibrous folds give the panel good mechanical properties. However, it is conceivable to use folds with a ceramic matrix without fibers, a material conventionally used to manufacture such panels. More generally, the folds can be with ceramic matrix or with geopolymer matrix or with thermoset matrix, and may or may not comprise fibers.

Advantageously, in the cellular structure according to the disclosure, the mechanical holding between the central portion of the fibrous fold and the neighboring skin is greatly improved by the presence of fibers contained in the fold and extending continuously from the central portion to the peripheral portion extending along said skin.

In one variation, for one or several folds, the at least one central portion can extend transversely from one of the skins up to the other skin.

In other words, according to this latter variation, at least one fold may comprise a portion, in this case a so-called central portion, which extends between the two skins over the entire thickness of the cellular structure, the thickness of the cellular structure being considered as the distance between the two skins at least at this central portion of the concerned fold. By way of non-limiting example, a fold may comprise a central portion which alone constitutes a transverse partition wall. In another alternative example in accordance with this variation, a transverse partition wall may comprise a superposition of a respective central portion of two folds.

In one variation, one or several folds may each comprise at least one first peripheral portion extending along one of the skins and at least one second peripheral portion extending along the other skin.

In other words, according to this latter variation, at least one fold can comprise at least two peripheral portions which extend along each of the two respective skins of the panel.

The last two variations can of course be combined so that a fold can for example comprise a central portion and two peripheral portions on either side of the central portion. In this example, one of the peripheral portions can extend along one of the skins, the central portion can extend transversely between the two skins over the entire thickness of the cellular structure, and the other peripheral portion can extend along the other skin. This example is non-limiting and many variants can be envisaged on this basis, in particular the variants described hereinbelow.

In a first variant, for one or several folds, said first peripheral portion can extend along one of the skins so as to delimit at least one portion of at least one first cell, and said second peripheral portion can extend along the other skin so as to delimit at least one portion of at least one second cell adjacent to the first cell. A fold thus arranged can thus have a "Z" shape, the oblique bar of the "Z" shape representing the central portion of the fold, and the horizontal bars of the "Z" shape representing the respective peripheral portions of the fold.

In a second variant, for one or several folds, said first peripheral portion can extend along one of the skins so as to delimit at least one portion of at least one cell, and said second peripheral portion can extend along the other skin so as to delimit at least one portion of this same cell. A fold thus arranged can thus have a "C" shape, the substantially vertical portion of the "C" shape representing the central portion of the fold, and the substantially horizontal portions of the "C" shape representing the respective peripheral portions of the fold.

In a third variant, one or several folds may each comprise: on the one hand, a first central portion extending transversely so as to form at least one portion of at least one first transverse partition wall of at least one cell; and, on the other hand, a second central portion extending transversely so as to form at least one portion of at least one second transverse partition wall of this same cell. A fold thus arranged can thus have a "U" or Omega ("Ω") shape, the vertical portions of the "U" shape or of the Omega shape representing the respective central portions of the fold, and the substantially horizontal portion of the "U" shape or of the upper top of the Omega shape representing the at least one peripheral portion of the fold delimiting this same cell.

This third variant allows obtaining, between the skin and a cell enveloped or constituted by such a fold, a constant fold thickness. A constant fold thickness improves the acoustic properties of the panel when such a fold separates a cell forming a Helmholtz cavity and a skin of the panel, or when this fold constitutes a portion of a skin delimiting a cell forming a Helmholtz cavity.

Whatever the variant, the fold(s) thus arranged may comprise other central and/or peripheral portions. For example, a fold according to the third variant may comprise, in addition to a peripheral portion extending along one of the skins so as to delimit the concerned cell (corresponding to the top of the Omega shape, in the example hereinabove), two other peripheral portions extending along the other skin. These other peripheral portions represented by the base of the Omega shape can each extend along said other skin either to respectively delimit at least one portion of the same cell or to delimit at least one portion of a cell neighboring and adjacent to the central portion from which the peripheral portion extends, for example.

In one variation, for one or several folds, said central portion can longitudinally extend so as to form at least one portion of several adjacent transverse partition walls. These adjacent transverse partition walls may be transverse partition walls of the same cell and/or of several adjacent cells. The expression "adjacent transverse partition walls" designates adjacent transverse partition walls two by two, each of these transverse partition walls being not necessarily adjacent to all the other transverse partition walls.

This latter variation further reinforces the structural holding of the panel, such a fold thus constituting a relatively extensive reinforcement in the panel, not limited to the dimension of a single cell when said adjacent transverse partition walls are transverse partition walls of several cells.

The present disclosure also includes:
- an exhaust nozzle component of a nacelle of an aircraft propulsion assembly, for example an ejection cone or a primary nozzle of a turbojet engine nacelle, comprising such a panel;
- a component of an aircraft turbojet engine nacelle comprising such a panel; and
- a nacelle of an aircraft turbojet engine or turbomachine comprising such a panel.

According to another aspect, the present disclosure includes a method for manufacturing a panel for a nacelle of an aircraft propulsion assembly, this panel comprising two skins and a cellular structure between these two skins, the cellular structure comprising transverse partition walls delimiting cells.

The method comprises a draping step in which at least one fold is disposed on at least one polyhedral or substantially polyhedral mold element (the polyhedron edges can be blunted, or chamfered, or rounded). The at least one mold element comprises lateral faces, an upper face and a lower face.

In some variations, the upper and lower faces of the at least one mold element can be arranged so that, when the skins of the panel are placed on the at least one mold element, these upper and lower faces respectively face the skins of the panel.

According to the disclosure, during the draping step:
- a central portion of the at least one fold is disposed on at least one portion of at least one lateral face of the at least one mold element, and
- a peripheral portion of the at least one fold is disposed on at least one portion of the upper and/or lower face of the at least one mold element.

Thus, a sandwich panel can be obtained by placing a set of mold elements adjacent to each other between the two skins, the step of draping these mold elements allowing to form the outline of the cells of the panel.

The method also comprises a step of extracting the at least one mold element.

In some variations, the extraction step is carried out so that the at least one mold element defines at least one respective cell, that is to say so that a given mold element defines a given cell of the cellular structure. In other words, each mold element used in the manufacturing method can correspond to a respective cell of the panel.

According to the disclosure, said central portion of the at least one fold forms at least one portion of at least one of said transverse partition walls of the panel, and said peripheral portion of the at least one fold extends along at least one skin of the panel.

Such a method allows manufacture of a panel according to the teachings of the present disclosure in a simple manner and at a lower cost.

For example, such a method provides draping successively and/or in parallel several mold elements and/or several rows of mold elements in a relatively simple manner, thereby allowing or authorizing the mold elements to be positioned according to a flexible or reconfigurable arrangement during its implementation.

In addition, the teachings of the present disclosure allow manufacturing such a panel at least according to the two approaches which follow.

According to a first approach, the cellular structure can be pre-assembled by implementing the draping and extraction steps. The cellular structure thus pre-assembled can then be fixed to the skins to form the panel.

According to a second approach, the method can comprise a step of manufacturing the at least one mold element from a fugitive material. According to this second approach, the extraction step comprises a heat and/or chemical treatment step arranged to eliminate the fugitive material. The fugitive material can for example be a material adapted to be eliminated under the effect of heat. For example, the fugitive material can comprise a thermoplastic material such as for example polyethylene, or a polymethyl methacrylate («PMMA»), or a thermosetting material for example epoxy or polyurethane foam based material, or even a low melting point metal, for example lead or tin-based material. According to the selected fugitive material, its elimination can in particular be carried out by combustion, oxidation, fusion, evaporation or sublimation.

According to yet another aspect, the present disclosure provides a mold device for manufacturing such a panel using such a method. The mold device comprises polyhedral mold elements made of fugitive material, and each mold element comprising lateral faces, an upper face and a lower face. The mold elements are arranged to receive at least one fold so that:
  a central portion of the at least one fold can be disposed on at least one portion of at least one lateral face of at least one mold element,
  a peripheral portion of the at least one fold can be disposed on at least one portion of the upper and/or lower face of at least one mold element,
  and the mold device further comprising channels arranged to evacuate the fugitive material when the latter undergoes heat and/or chemical treatment.

According to the disclosure, the mold device further comprises channels arranged to evacuate the fugitive material when the latter undergoes heat and/or chemical treatment.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6 is a partially broken away schematic perspective view, of folds of a cellular structure of a panel according to the teachings of the present disclosure, the folds being disposed on mold elements;

FIG. 7 is a schematic perspective view of mold elements;

FIG. 8 is a partial schematic side sectional view showing a fold disposed on the mold elements of FIG. 7 in a section A-A;

FIG. 9 is a partial schematic side sectional view showing two folds disposed on the mold elements of FIG. 7 in a section B-B;

FIG. 10 is a partial schematic side sectional view showing a fold disposed on the mold elements of FIG. 7 in a section C-C;

FIG. 11 is a partial schematic side sectional view showing a fold disposed on the mold elements of FIG. 7 in a section D-D;

Generally, identical or similar elements are identified by identical reference numerals in all figures. Certain similar elements are however identified by their own reference numerals in order to facilitate their description.

Figure 1:
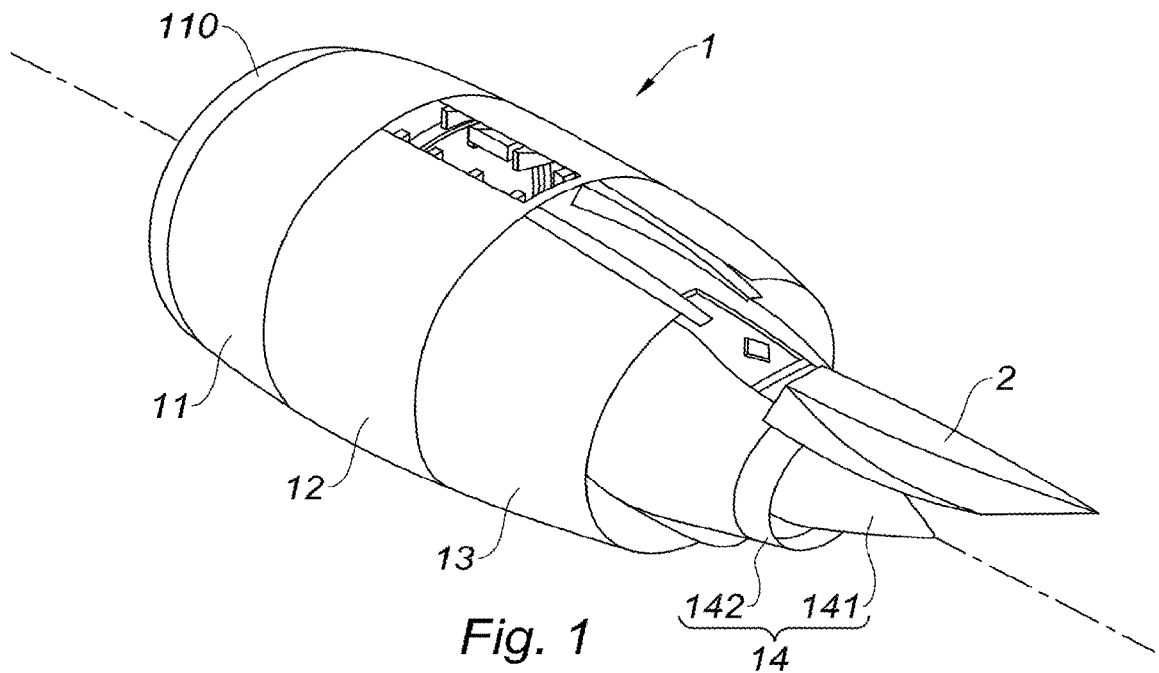
FIG. 1 is a schematic perspective view of an aircraft turbojet engine nacelle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a panel for a nacelle of an aircraft propulsion assembly.

An example of an aircraft (not represented) turbojet engine (not represented) nacelle 1 is illustrated in FIG. 1. This nacelle 1 comprises a pylon 2 intended to be fastened to a wing (not represented) of the aircraft. The nacelle 1 comprises an upstream section 11 provided with a lip 110 forming an air inlet. This upstream section 11 is adapted to allow the optimal capture towards the turbojet engine of the air needed to supply a fan (not represented) and inner compressors (not represented) of the turbojet engine. The nacelle 1 also comprises a middle section 12 receiving the fan as well as a downstream section 13. Under the pylon 2 and downstream of the turbojet engine, the nacelle 1 comprises an exhaust nozzle 14 comprising a gas ejection cone 141 ("plug") and a primary nozzle 142 ("nozzle"). The ejection cone 141 and the primary nozzle 142 of the exhaust nozzle 14 define a passage for a hot air flow exiting the turbojet engine.

Such a nacelle 1 and in particular such an exhaust nozzle 14 typically comprise structural panels of the "sandwich panel" type which generally also provide an acoustic treatment function in order to attenuate the noise generated by the turbojet engine.

The teachings of the present disclosure are not only however aimed at applications for an ejection cone or primary nozzle of an exhaust nozzle. In a non-limiting manner, a panel according to the disclosure can also be used to equip a mixer (not represented) of the exhaust nozzle 14, or also to cover the pylon 2 and/or downstream inner ducts (not represented) of a nacelle. More generally, the disclosure aims at any nacelle of an aircraft propulsion assembly, whether it is a nacelle called under wing as shown in FIG. 1, or a nacelle along the fuselage (not represented), or of an aircraft turbomachine nacelle (for example of a helicopter).

These structural and/or acoustic panels can be panels in accordance with the following description.

Figure 2:
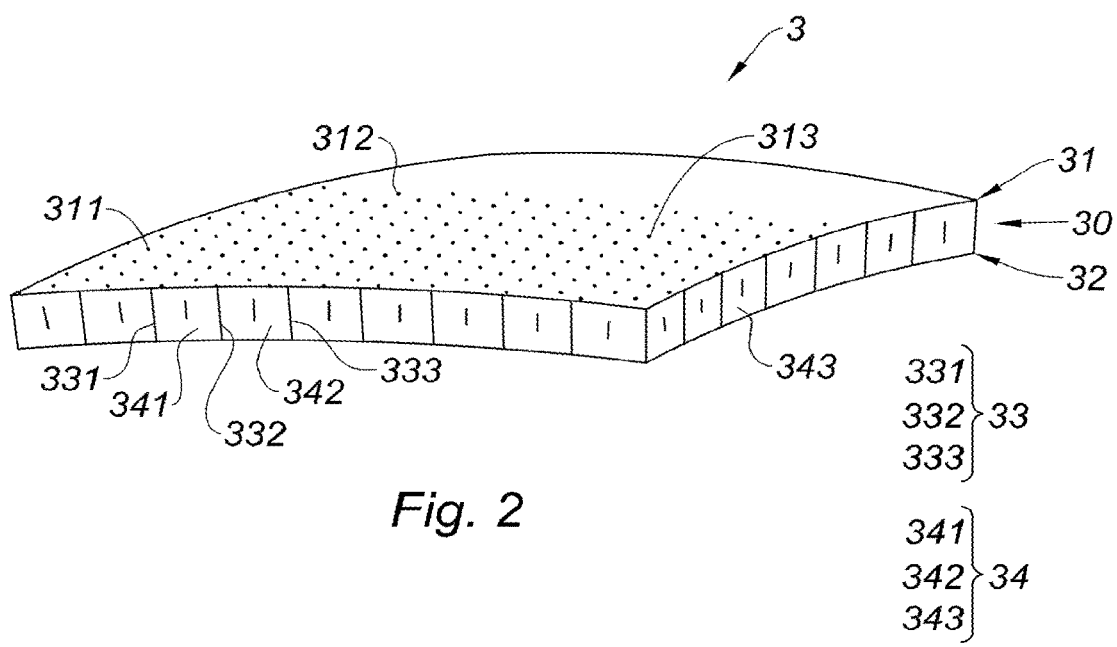
FIG. 2 is a schematic perspective view of a panel according to the teachings of the present disclosure.

With reference to FIG. 2, the teachings of the present disclosure provide a panel 3 comprising two skins 31 and 32, and a cellular structure 30 between these two skins 31 and 32.

The cellular structure 30 comprises transverse partition walls 33 (comprising in particular the partitions 331, 332 and 333) delimiting cells 34 (comprising in particular cells 341, 342 and 343).

In this example, the skin 31 is an acoustic skin comprising perforations 311-313 putting the cells 34 in communication with an external volume of the panel 3. When this panel 3 equips or constitutes for example the gas ejection cone 141 of an aircraft turbojet engine nacelle 1, this external volume of the panel 3 at least partially delimits said passage conveying the hot air flow exiting the turbojet engine.

In particular in order to withstand the temperatures of a such hot air flow, or more generally the thermal and mechanical stresses of a nacelle 1 of an aircraft propulsion assembly, the skins 31 and 32 are in this example fibrous skins, comprising fibers of a ceramic material.

According to the disclosure, the panel 3 comprises folds 35 (see for example FIGS. 3 to 6 and 8 to 13).

Figure 3:
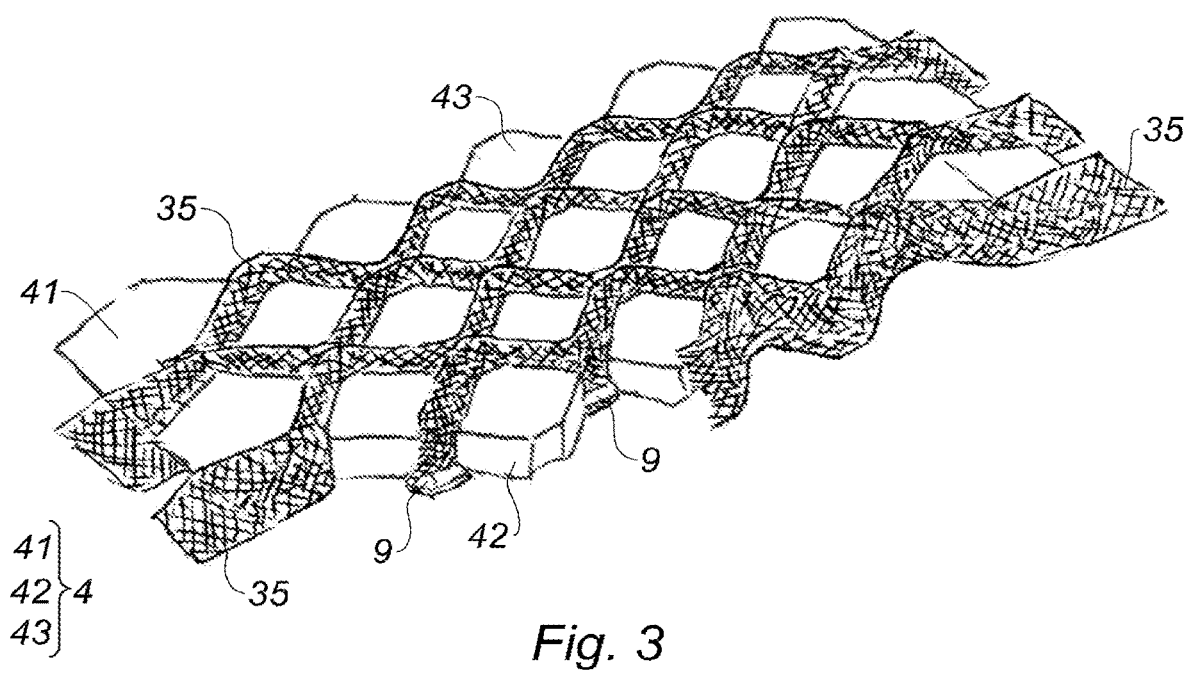
FIG. 3 is a partially broken away schematic perspective view, of folds of a cellular structure of a panel according to the teachings of the present disclosure, the folds being disposed on mold elements.

FIGS. 3 and 6 show folds 35 forming a continuous structure enveloping mold elements 4 (comprising mold elements 41, 42 and 43 in FIG. 3, and mold elements 44, 45, 46 in FIG. 6). As detailed hereinbelow, after draping with folds 35, the mold elements 4 are extracted so that the spaces freed up by their extraction define the cells 34 which, with the folds 35, constitute said cellular structure 30 of the panel 3.

According to the disclosure, each fold 35 comprises:
at least one central portion extending transversely so as to form at least one portion of at least one transverse partition wall 33, and
at least one peripheral portion extending along at least one of the skins 31 and/or 32.

Figure 5:
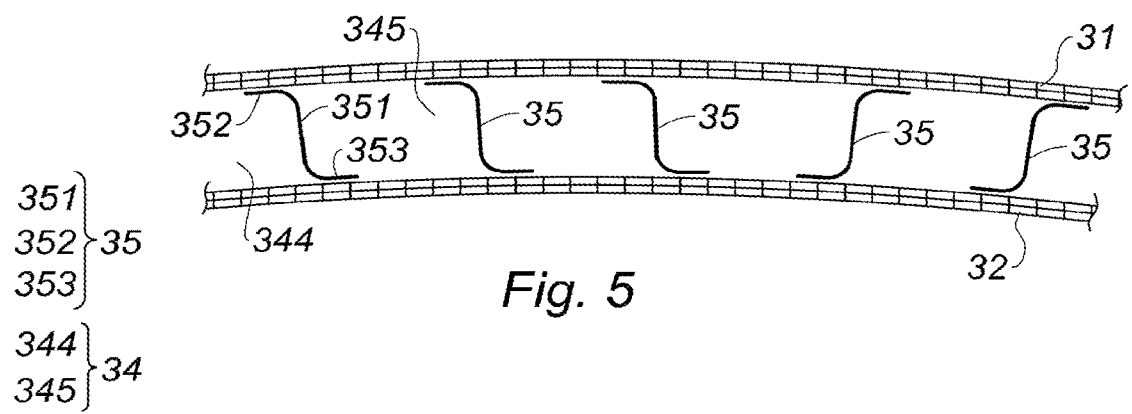
FIG. 5 is a partial schematic side sectional view of a panel according to the teachings of the present disclosure.

In the example of FIG. 5 which schematically illustrates, in partial side view, a panel according to the disclosure, the folds 35 shown in this figure each comprise a single central portion 351 and two peripheral portions 352 and 353.

According to the terminology adopted in this document, and as already specified in this document, a fold portion is called "central" or "peripheral" relative to the location of this portion in the panel 3.

Thus, in the example of FIG. 5, the central portion 351 extends transversely between the two skins 31 and 32, and forms a transverse partition wall delimiting for example two cells 344 and 345. The peripheral portions 352 and 353 extend respectively along the skins 31 and 32. In this case, the peripheral portion 352 extends along the skin 31 and the peripheral portion 353 extends along the skin 32.

Figure 4:
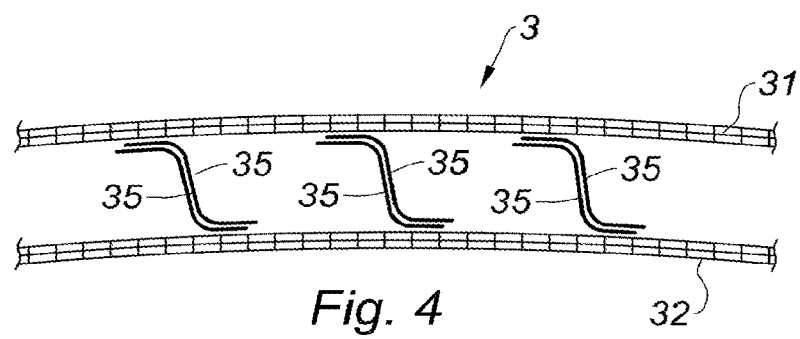
FIG. 4 is a partial schematic side sectional view of a panel according to the teachings of the present disclosure.

As can be seen from FIG. 4, the transverse partition walls may locally or globally comprise more than one fold 35, here two superimposed folds 35.

More generally, a central portion of a fold 35 can form only one portion of a transverse partition wall, another portion of this transverse partition wall can be formed by one or several other folds 35.

Figure 29:
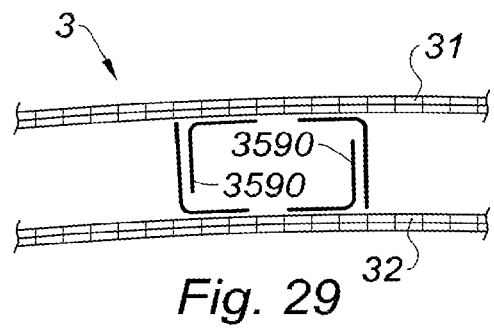

It further appears from the examples in FIGS. 4 and 5 that said central portion of a fold 35 can extend transversely from one of the skins 31 up to the other skin 32. Such a characteristic is generally desired to improve the structural holding of the panel 3. Nonetheless, a transverse partition wall could be formed by several folds, for example stacked in layers (example of FIGS. 4 and 29), one or several of the folds forming part of this transverse partition wall can extend transversely on only one portion of the thickness of the panel 3, that is to say extend from one of the skins to the other skin but not necessarily up to this other skin (e.g., see folds 3590 of the FIG. 29). In other words, certain folds of the panel can constitute angles. Nevertheless and generally, it is desired but not mandatory for each transverse partition wall to comprise at least one fold having a central portion extending transversely from one of the skins to the other skin, as illustrated in particular in the FIGS. 4 and 5.

Several arrangements of the peripheral(s) and central(s) portions of fold can be envisaged.

A first type of fold arrangement is that illustrated in particular in FIGS. 4 and 5 showing panels whose folds 35 each comprise a central portion 351 and two peripheral portions 352 and 353 (see more specifically FIG. 5). In this example, the central portion 351 extends transversely from the skin 31 up to the skin 32. According to this first type of arrangement, such a fold 35 comprises a peripheral portion 352 which extends along the skin 31 so as to delimit a portion of the cell 344, and a second peripheral portion 353 which extends along the skin 32 so as to delimit a portion of the cell 345, this cell 345 being adjacent to the cell 344. Thus, the folds 35 of the panels of FIGS. 4 and 5 have a "Z" shape, the oblique bar of the "Z" shape representing the central portion 351 of the fold 35, the horizontal bars of the "Z" shape respectively representing the peripheral portions 352 and 353 of the fold 35.

Figure 12:
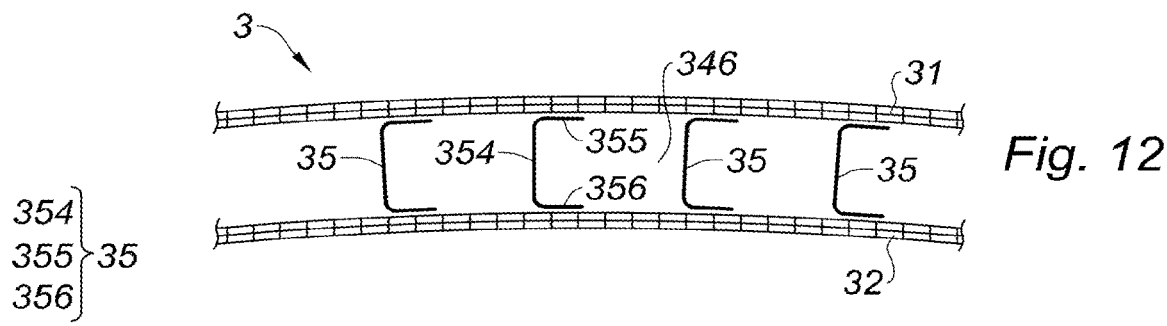
FIG. 12 is a partial schematic side sectional view of a panel according to the teachings of the present disclosure.
Figure 13:
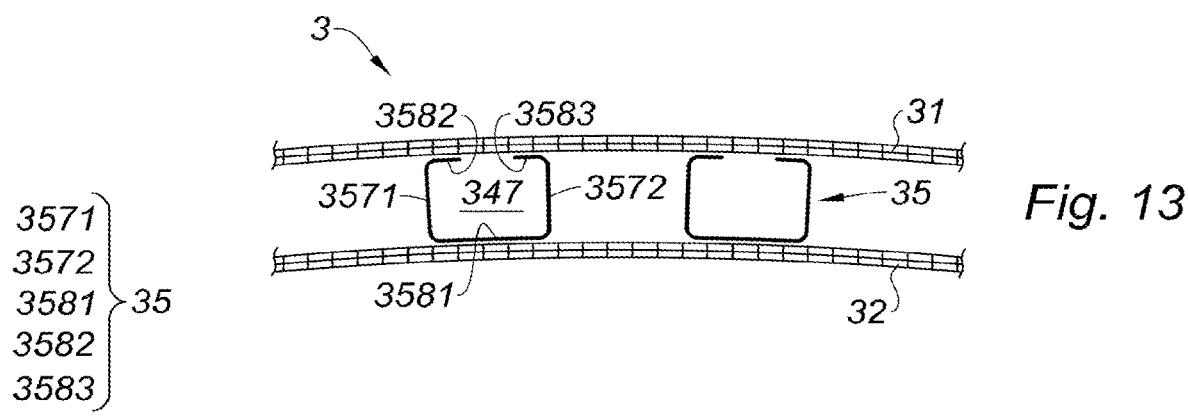
FIG. 13 is a partial schematic side sectional view of a panel according to the teachings of the present disclosure.
Figure 14:
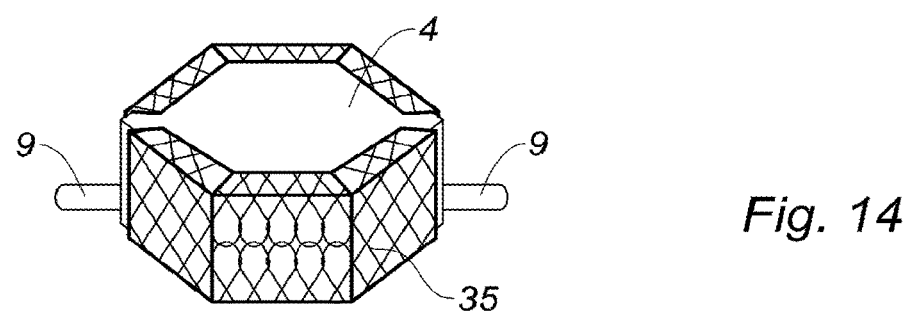
FIG. 14 is a schematic top perspective view of a mold element draped with a fold.
Figure 15:
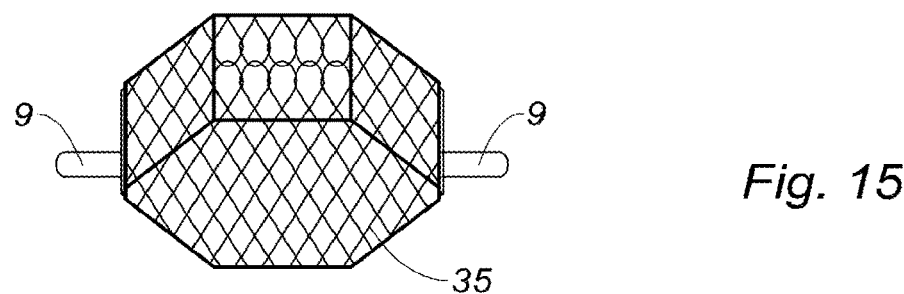
FIG. 15 is a schematic top perspective view of the mold element and the fold of FIG. 14.

A second type of fold arrangement is that illustrated in FIG. 12, showing a panel 3 whose folds 35 each comprising a central portion 354 and two peripheral portions 355 and 356. In this example, the central portion 354 extends transversely from the skin 31 up to the skin 32. According to this second type of arrangement, such a fold 35 comprises a peripheral portion 355 which extends along the skin 31 so as to delimit a portion of the cell 346, and a second peripheral portion 356 which extends along the skin 32 so as to delimit a portion of this same cell 346. Thus, the folds 35 of the panel 3 of FIG. 12 have a "C" shape, the substantially vertical portion of the "C" shape representing the central portion 354 of the fold 35, and the substantially horizontal portions of "C" shape representing the peripheral portions 355 and 356 of the fold 35.

A third type of fold arrangement is that illustrated in FIGS. 13 to 17. With more specific reference to the example in FIG. 13, the folds 35 of the panel 3 each comprise two central portions 3571 and 3572 and at least one peripheral portion. In this example, the folds 35 each comprise three peripheral portions 3581, 3582 and 3583. In another variation not represented, in accordance with this third type of arrangement, the fold 35 may comprise two central portions 3571 and 3572 and a single peripheral portion 3581. More specifically, in the example of FIG. 13, the central portion 3571 extends transversely so as to form at least one portion of at least one first transverse partition wall of the cell 347. The central portion 3572 transversely extends so as to form at least one portion of at least one second transverse partition wall of this same cell 347. The peripheral portion 3581 extends along the skin 32 so as to delimit a portion of this same cell 347. The peripheral portions 3582 and 3583 extend along the skin 31 so as to delimit a portion of this same cell 347. Thus, according to this third type of arrangement, the folds 35 have a substantially "U" shape or "Ω" shape, the vertical portions of the "U" shape or of the "Ω" shape representing the central portions 3571 and 3572 of the fold 35, and the substantially horizontal base portion of the "U" shape or of the "Ω" shape, representing the peripheral portion 3581 of the fold 35 and the lateral bases of the "Ω" shape representing the peripheral portions 3582 and 3583.

Figure 30:
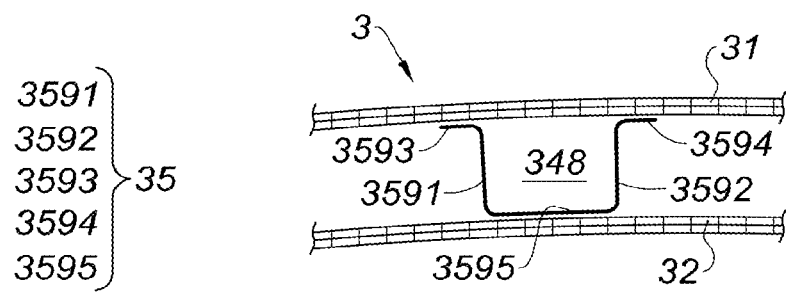

A variant of this third type of fold arrangement is illustrated in FIG. 30 which represents a single fold. This fold comprises two central portions 3591 and 3592 and three peripheral portions 3593, 3594 and 3595. The central portion 3591 extends transversely so as to form at least one portion of at least one first transverse partition wall of the cell 348. The central portion 3592 extends transversely so as to form at least one portion of at least one second transverse partition wall of this same cell 348. The peripheral portion 3595 extends along the skin 32 so as to delimit a portion of this same cell 348. The peripheral portions 3593 and 3594 extend along the skin 31 so as to define a portion of two respective cells adjacent to the cell 348.

Figure 31:
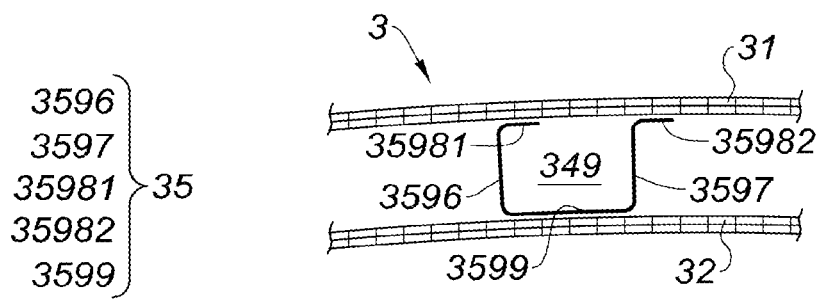

Another variant of this third type of fold arrangement is illustrated in FIG. 31 which represents a single fold. This fold comprises two central portions 3596 and 3597 and three peripheral portions 35981, 35982 and 3599. The central portion 3596 extends transversely so as to form at least one portion of at least one first transverse partition wall of the cell 349. The central portion 3597 transversely so as to form at least one portion of at least one second transverse partition wall of this same cell 349. The peripheral portion 3599 extends along the skin 32 so as to delimit a portion of this same cell 349. The peripheral portion 35981 extends along the skin 31 so as to delimit a portion of this same cell 349. The peripheral portion 35982 extends along the skin 31 so as to delimit a portion of a cell adjacent to the cell 349.

Figure 28:
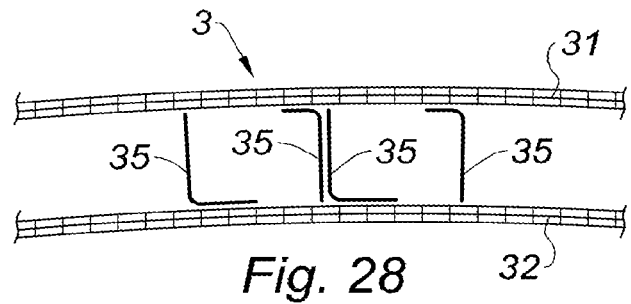
FIGS. 28 to 31 are partial schematic side sectional views of panels according to the teachings of the present disclosure.

A fourth type of fold arrangement is that illustrated in FIG. 28 showing a panel 3 whose folds 35 each comprising a central portion and a peripheral portion. In this example, the central portion extends transversely from the skin 31 to the skin 32. The peripheral portion extends along one of the skins so as to delimit a portion of a cell. The folds 35 of the panel 3 of FIG. 28 have an "L" shape, the vertical bar of the "L" shape representing the central portion of the fold 35, and the horizontal bar of the "Ω" shape representing the peripheral portion of the fold 35.

Figure 16:
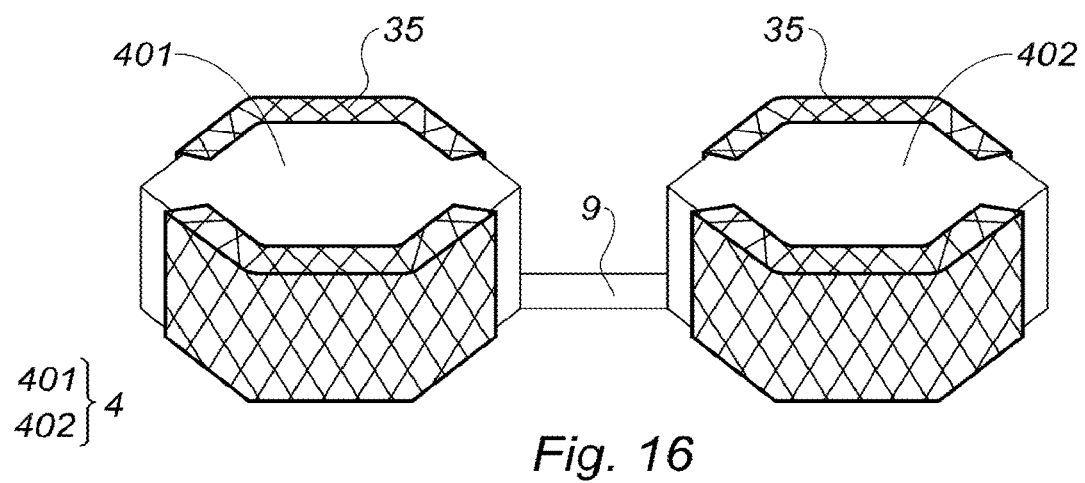
FIG. 16 is a schematic top perspective view of two adjacent mold elements, each draped with a respective fold.
Figure 17:
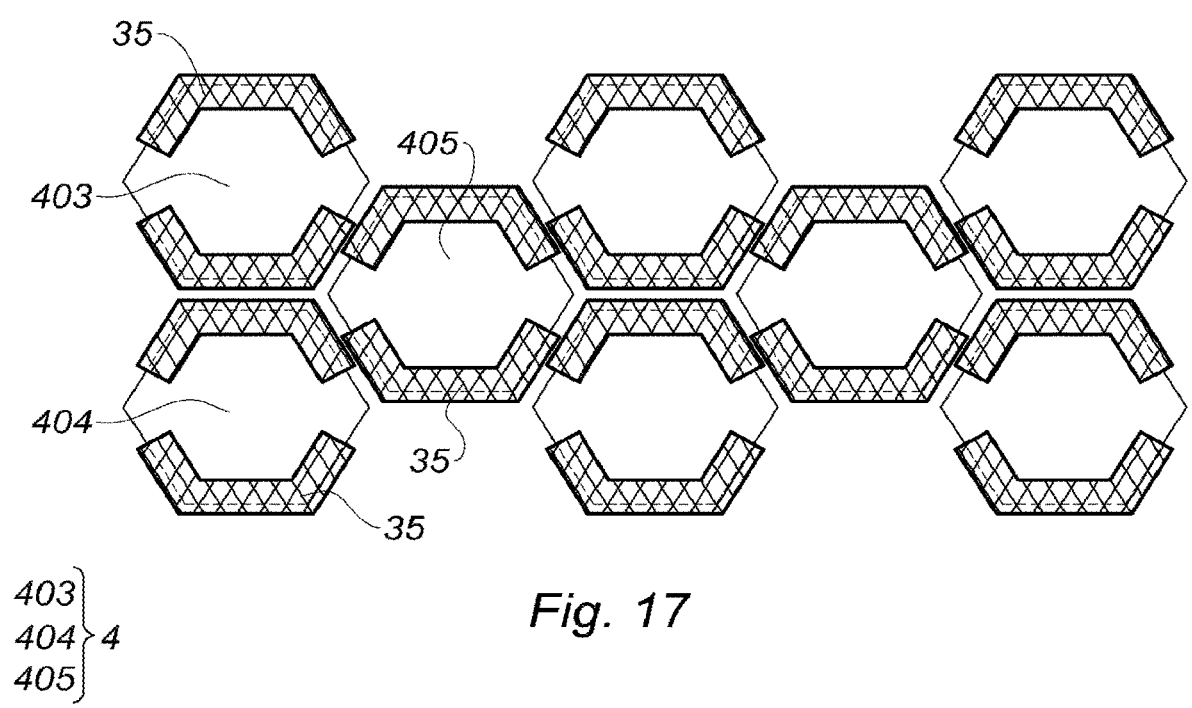
FIG. 17 is a schematic top view of adjacent mold elements, each draped with a respective fold.

FIGS. 14 to 17 show one (FIGS. 14 and 15) or several (FIGS. 16 and 17) mold elements 4 (comprising mold elements 401 and 402 in FIG. 16, and mold elements 403 405 in FIG. 17). Each of these mold elements 4 is in this example draped with a fold 35 according to the third type of fold arrangement described hereinabove.

Of course, these different types of fold arrangement can be combined within the same panel (not represented).

Figure 18:
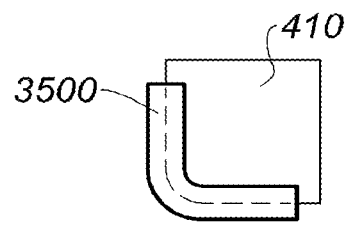
FIG. 18 is a schematic top view of a mold element and a fold, defining a first sub-assembly.
Figure 19:
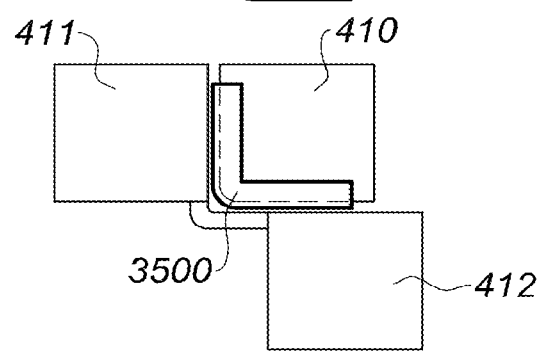
FIG. 19 is a schematic top view of the first sub-assembly of FIG. 18 to which are added two additional mold elements, defining a second sub-assembly.
Figure 20:
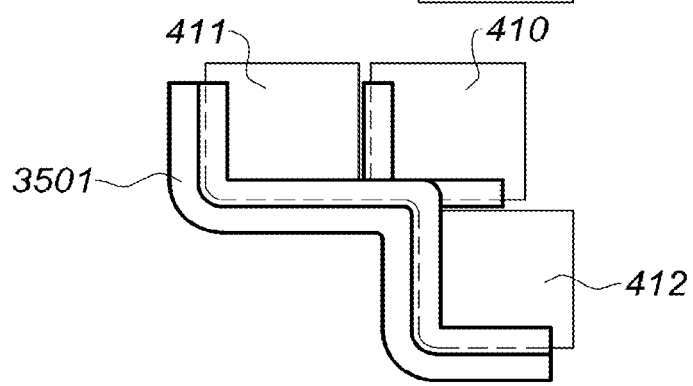
FIG. 20 is a schematic top view of the second sub-assembly of FIG. 19 to which is added an additional fold, defining a third sub-assembly.
Figure 21:
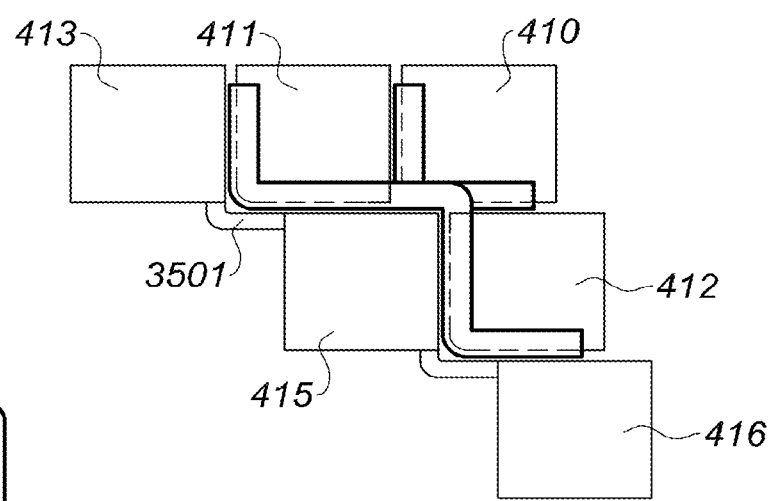
FIG. 21 is a schematic top view of the third sub-assembly of FIG. 20 to which are added three additional mold elements.
Figure 22:
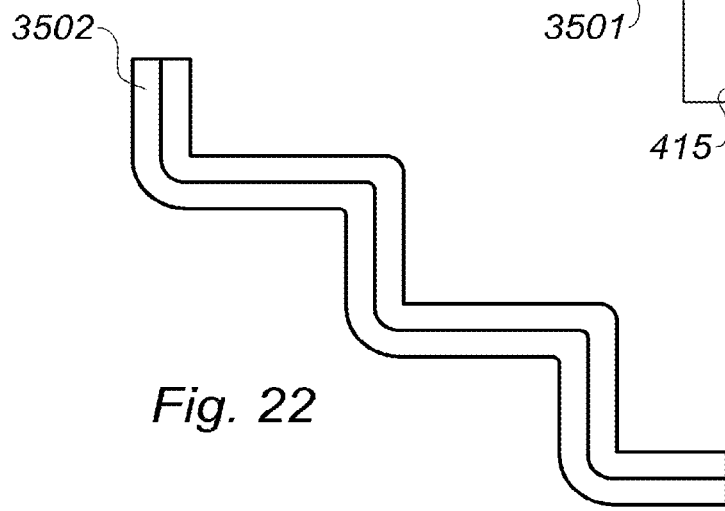
FIG. 22 is a schematic top view of a fold arranged to drape said three additional mold elements of FIG. 21.

In addition, as can be deduced from FIGS. 18 to 22, the central portion of a fold can extend longitudinally so as to form at least one portion of several adjacent transverse partition walls. In this example, the fold 3500 covers a portion of the mold element 410 (FIG. 18). This fold 3500 forms at least one portion of the transverse partition walls delimiting, on the one hand the mold elements 410 and 411 and, on the other hand, the mold elements 410 and 412 (FIG. 19). The fold 3501 covers a respective portion of the mold elements 411 and 412 (FIG. 20), and also covers a small portion of the fold 3500 facing the portion of the mold element 410 between the elements 411 and 412. This fold 3501 forms at least one portion of the transverse partition walls respectively delimiting the mold elements 411 and 413, 411 and 415, 412 and 415, and 412 and 416 (FIG. 21). According to the same principle, the fold 3502, represented in isolation in FIG. 22, can cover a portion of the mold elements 413, 415 and 416, and small portions of the fold 3501 facing the portion of the mold element 411 between the mold elements 413 and 415 and the mold element portion 412 between the mold elements 415 and 416.

This type of arrangement advantageously provides, at the same time, the constitution of separate cells whose walls are continuously reinforced, and whose continuity of force transfer with the faces is also achieved.

Figure 27:
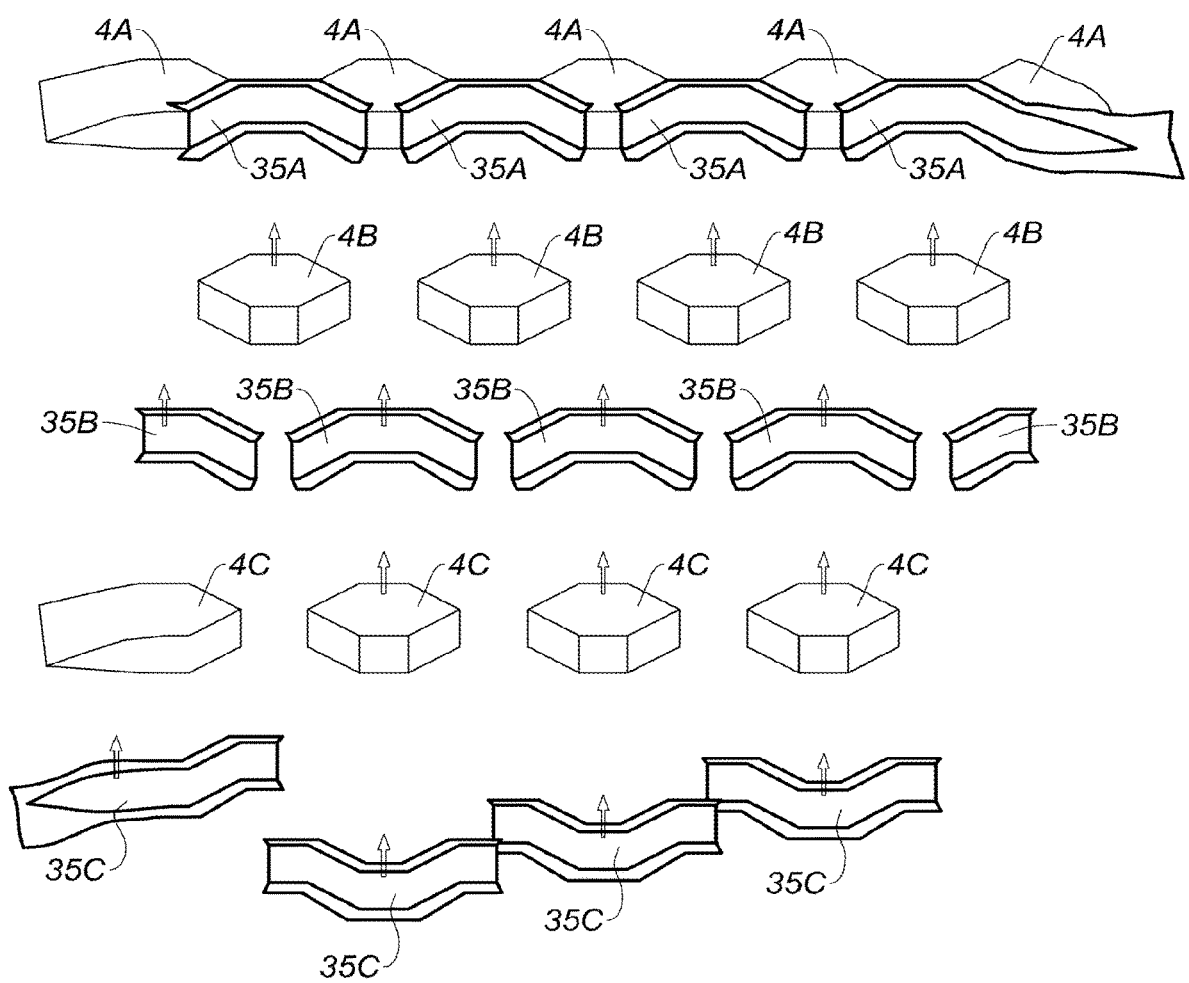
FIG. 27 is a partially exploded schematic perspective view, of three rows of mold elements and respective folds.

FIG. 27 shows another example of arrangement and positioning of folds 35A-35C relative to mold elements 4A-4C. Only three rows of mold elements (and corresponding folds) have been represented for illustrative reasons. The mold elements 4A constitute a first row and are draped with folds 35A. The mold elements 4B constituting a second row are placed against the folds 35A and are draped with folds 35B. The mold elements 4C constituting a third row are placed against the folds 35B and are draped with folds 35C and so on.

In this example, the mold elements 4A-4C, seen from above, have a substantially hexagonal shape, comprising four large lateral walls and two small walls, the dimension of the small walls corresponding to the separation distance between two mold elements of the same row. The folds 35A, 35B and 35C are so disposed that they each make the separation between, firstly, three adjacent lateral walls of the same first mold element (comprising two large lateral walls and a small lateral wall), secondly, a small lateral wall of a second mold element and, thirdly, at least one large lateral wall of a third and/or fourth mold element.

In a first variant, the ends of two successive folds of the same row do not overlap (case of folds 35A and 35B). Each cell is then made independent by a fold of the next row, more precisely by its central portion covering a small lateral wall of the corresponding mold element and partially covering central or even peripheral portions of folds of the previous row.

In a second variant, the ends of successive folds of the same row overlap each other, completing the isolation of the cells produced by the folds portions draped over the small lateral walls of mold elements.

In further other variants (not exclusive of the previous ones), the folds are installed in hollow between two mold elements (case of folds 35A and 35B), or the folds are installed as a bump covering a single mold element (case of folds 35C).

In some variations, it will be arranged so that the size of the small lateral walls is sufficient to allow two folds installed in the hollow (see previous paragraph) to overlap at least partially on a small lateral wall in order to provide good isolation between adjacent cells whose transverse partition walls which separate them comprise such folds.

Thus, the "continuous" structure which envelops the mold elements 4 of FIG. 3 can comprise or be formed of one or several folds, these folds being able to extend between several mold elements 4. This last characteristic allows to reinforce the structural holding of the panel 3 whose cellular structure 30 comprises or is formed by folds 35 thus extended.

The sequence respectively illustrated in FIGS. 18 to 22 indicates a possible generic approach for manufacturing a panel according to the disclosure.

More specifically, the disclosure provides a manufacturing method comprising a draping step in which at least one fold is disposed on at least one polyhedral mold element.

FIGS. 6, 7 and 18 to 21 show substantially parallelepiped mold elements (see for example mold elements 47-49 in FIG. 7). In FIGS. 18 to 21, the top view of the mold elements only shows an upper face of these mold elements.

FIGS. 3 and 14 to 17 show mold elements comprising an upper face and a lower face parallel to each other, as well as six lateral faces substantially perpendicular to the upper and lower faces.

More generally, the at least one mold element implemented in the method according to the disclosure comprises an upper face and a lower face, as well as lateral faces in a number adapted to the desired geometry of the cells.

According to the disclosure, during the draping step, a central portion of the at least one fold is disposed on at least one portion of at least one lateral face of the at least one mold element. In addition, during this draping step, a peripheral portion of the at least one fold is disposed on at least one portion of the upper and/or lower face of the at least one mold element.

It appears from the foregoing description, relative in particular to FIGS. 18 to 22 and to FIG. 27, that such a method allows to drape successively and/or in parallel several mold elements and/or several rows of mold elements in a relatively simple manner.

In some variations, the mold elements are successively disposed by being offset from one another (or staggered), as shown in particular in the examples of FIGS. 6, 7 and 21. In particular, two mold elements of identical shape can be offset from each other so that no straight line passes through both a lateral face of one of these mold elements and a lateral face of the other mold element. Such an offset is arranged so as to allow at least one portion of the central portion of a fold installed on one or several mold elements of a first row to cover at least one central portion of one or several folds installed on one or several mold elements of a second row adjacent to the first row. This also improves the isolation between cells and provides good transmission of mechanical forces from one transverse partition wall to the other.

Figure 23:
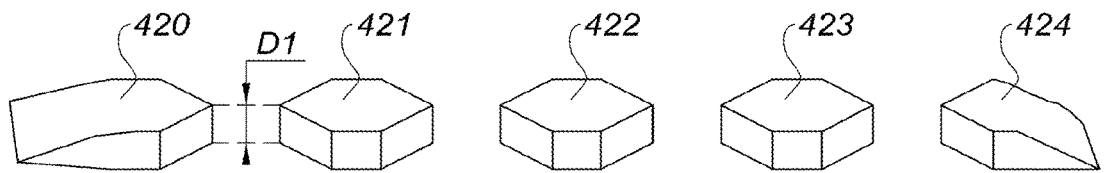
FIG. 23 is a schematic top perspective view of five adjacent mold elements.
Figure 24:
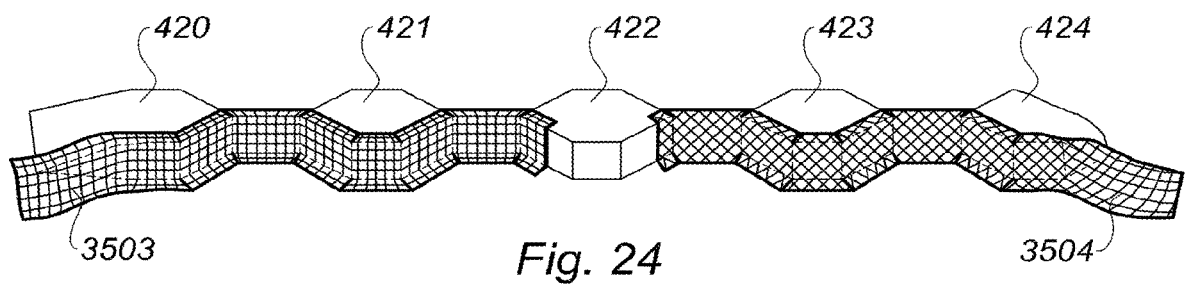
FIG. 24 is a partially broken away schematic perspective view, of the mold elements of FIG. 23 draped with two folds which are distinguished from each other by the orientation of their texture.

FIG. 23 shows mold elements 420 to 424 constituting a row of mold elements, which can be draped by folds 3503 and 3504 illustrated in FIG. 24. The thickness of the mold elements 420 to 424 will be considered hereinafter as their dimension from bottom to top of FIG. 23, represented by the dimension D1, the thickness of these mold elements defining a depth of the cells that they will constitute. FIG. 23 shows that the mold elements 421 to 423 each have a substantially constant thickness, while the mold elements 420 and 424 have a beveled shape, their thickness decreasing towards the outside of the row: the thickness of the mold element 420 decreases to the left of FIG. 23 and the thickness of the mold element 424 decreases to the right of FIG. 23. Such a beveled shape allows constituting end cells of the panel allowing the skins to meet so as to constitute a monolithic return (not represented). FIGS. 3 and 27 also show mold elements thus beveled, for example the mold element 41 (FIG. 3) and the mold element 4C (FIG. 27, mold element located on the left).

In the presence of such a monolithic return, an end of one or several folds, for example the end of fold 3503 located to the left of FIG. 24, can be pinched between the two skins of the panel (not represented). In this example, this fold end is arranged to extend both along one of the skins of the panel and, on its other face, along the other skin of the panel.

Fibrous textile folds will be used in some variations, for example fibers of a ceramic material.

The folds may for example comprise a complex of two layers of cross-linked material so as to define a mesh or a texture formed by groups of fibers substantially perpendicular to each other. The folds can also comprise two layers of fibers superimposed in two distinct directions, or structures of woven fibers (typically, oriented in two directions substantially perpendicular to one another) or braided (which may for example comprise two or three fiber directions).

Figure 25:
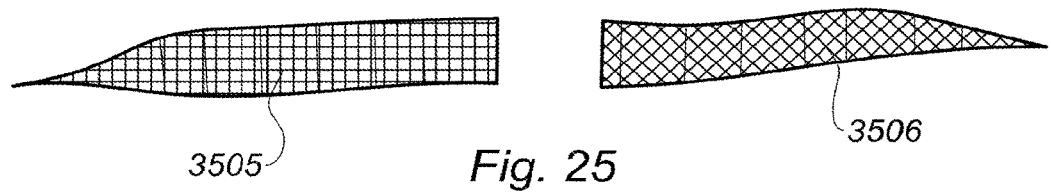
FIG. 25 is a partially broken away schematic side view, of two folds, which are distinguished from each other by the orientation of their texture, arranged to drape the mold elements of FIG. 23.

Thus, the fold 3503 of FIG. 24 and the fold 3505 of FIG. 25 each comprise a mesh provided with a group of fibers inclined at 0° relative to the upper surface of the mold element 421 for example and provided with a group of fibers inclined at 90° relative to the upper surface of this mold element 421.

The fold 3504 of FIG. 24 and the fold 3506 of FIG. 25 each comprise a mesh provided with a group of fibers inclined at −45° relative to the upper surface of the mold element 423 for example and provided with a group of fibers inclined at +45° relative to the upper surface of this mold element 423.

The fold can be cut in strips of fabric. For strips of fabric comprising two groups of fibers which are substantially perpendicular to each other, obtaining the inclination described hereinabove can be obtained by cutting them out in a chosen accordingly orientation.

Figure 26:
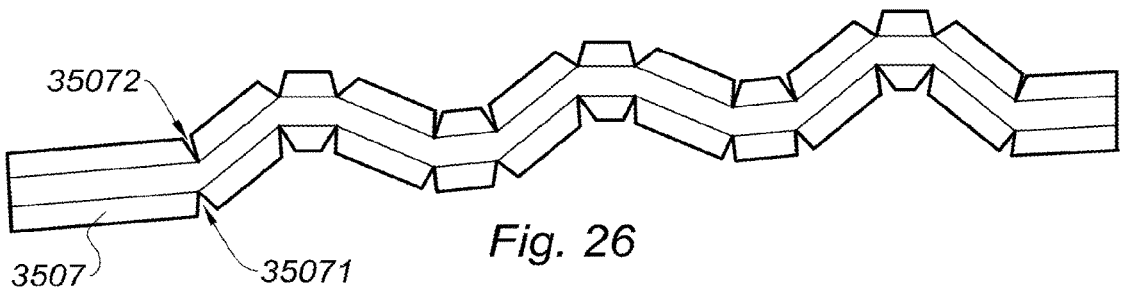
FIG. 26 is a schematic side view of a fold with precuts.

In addition, as illustrated in FIG. 26, when cutting a fold 3507, it is possible to provide openings 35071 and 35072, or precuts, to facilitate draping over the mold elements and/or to obtain a uniform draping over different faces of the same mold element and/or on different faces of different mold elements.

The method according to the disclosure also comprises a step of extracting the at least one mold element.

This extraction step is carried out after the draping step.

To be able to extract the at least one mold element, the at least one mold element can be manufactured from a fugitive material. The extraction as such, that is to say the elimination of the fugitive material, can be carried out according to principles known in the state of the prior art, for example described in the document FR 3 039 148 A1.

Thus, according to an approach described in the document FR 3 039 148 A1, mold elements can be draped with dry folds which are then subjected to liquid infiltration. The folds and mold elements can then be subjected to drying, heating for the elimination of the fugitive material, and then sintering steps.

According to another approach, mold elements can be draped with pre-impregnated folds. The folds and the mold elements can then be subjected to drying (for example in an autoclave), heating for the elimination of the fugitive material, then sintering steps.

According to yet another approach, the two approaches which have just been described can be combined.

More specifically, the extraction step may comprise a heat and/or chemical treatment step arranged to eliminate the fugitive material. To eliminate the fugitive material by heat treatment, this can comprise a material such that its softening temperature under load is greater than the consolidation temperature of the preform and its matrix, and lower than the sintering or degradation temperature of the preform and its matrix. The fugitive material can be taken for example from thermoplastic materials such as polyethylene or polymethyl methacrylate (PMMA), or a thermosetting material for example an epoxy-based material or else polyurethane foam or polyvinyl chloride foam-based material, or a metal with a low melting point, for example lead or tin-based metal. According to the selected fugitive material, its elimination can in particular be carried out by combustion, oxidation, fusion, evaporation or sublimation.

In order to evacuate the fugitive material, it is possible to connect mold elements to each other using a network of channels 9 represented in FIGS. 3, 7, 9, and 14 to 16. More particularly, FIG. 7 shows a mold device comprising such channels 9. These channels 9 can connect mold elements by placing the channels in any position of the mold elements. For example, in the example of FIG. 7, the mold elements 47 and 49 are connected by a channel 9 positioned towards the bottom of these mold elements taking into account their orientation in this figure. If desired, when draping the mold elements, folds can be disposed around the channels 9, as illustrated in FIG. 9.

The channels 9 thus constitute a connection between mold elements and can also be used to position mold elements during their assembly.

In one variation of the mold device, the mold elements may comprise one or several spikes on their upper and/or lower face in order to perforate one and/or the other skin during assembly of the mold device with the skins (not represented). An example of mold elements with spikes is described in the document FR 3 039 148 A1.

In one variation of the method, the cellular structure 30 can be pre-assembled by implementing the draping and extraction steps described hereinabove. The cellular structure thus pre-assembled can then be fastened to the skins 31 and 32 to form the panel 3.

Whatever approach is used to extract the at least one mold element, it appears from the foregoing description that the method according to the disclosure allows to form at least one portion of at least one of the transverse partition walls of the panel from said central portion of the at least one fold, said peripheral portion of the at least one fold thus extending along at least one skin of the panel.

In dimensional terms, the person skilled in the art can manufacture the panel according to the usual dimensions. For example, when the panel 3 is an acoustic panel, this can have a thickness comprised between 5 and 60 millimeters (mm). The cells 34, which in this example constitute Helmholtz cavities, may have a dimension comprised between 3.5 and 150 mm, for example comprised between 5 and 50 mm, this dimension corresponding to the diameter of a cylinder inscribed in a cell. One of the skins, the skin 31 in the example of FIG. 2, can comprise perforations 311-313. In some variations, these perforations represent a percentage of openings of the surface of the skin 31 comprised between 2 and 30%. These perforations or other complementary perforations can be carried out before the elimination of the mold elements, these perforations then being able to contribute to or facilitate the extraction of the mold elements.

Of course, the disclosure is not limited to the examples that have just been described and many arrangements may be made to these examples without departing from the scope of the disclosure. For example, orifices can be made in folds 35 so as to create an opening between adjacent cells 34, to allow the drainage of fluids during the implementation of the panel 3.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A panel for a nacelle of an aircraft propulsion assembly, comprising:
   two skins;
   a cellular structure between the two skins, the cellular structure comprising transverse partition walls delimiting cells;
   fibrous folds each comprising:
      a first peripheral portion extending along one of the two skins,
      a pair of central portions extending transversely from opposing ends of the first peripheral portion so as to form at least one portion of a pair of the transverse partition walls, the pair of the transverse partition walls defining the same one of the cells, the pair of central portions having ends disposed at the other one of the skins, and a pair of second peripheral portions extending from the ends of the pair of transverse partition walls toward each other and along the other one of the two skins, the pair of second peripheral portions being spaced apart from each other on the other one of the skins, wherein at least some of the fibrous folds are integrally manufactured as a continuous structure during manufacturing of the fibrous folds such that the first and second peripheral portions of the at least some of the fibrous folds are continuously formed to define a plurality of openings corresponding to respective ones of the cells, wherein the first peripheral portion has a main surface extending laterally from the pair of central portions and extending along and parallel to the one of the two skins and the pair of second peripheral portions each have a main surface extending laterally from one of the pair of central portions and extending along and parallel to the other one of the two skins.

2. The panel according to claim 1, wherein for one or several of the fibrous folds at least one of the pair of central portions extends transversely from the one of the two skins to the other one of the two skins.

3. The panel according to claim 1, wherein for one or several of the fibrous folds, the first peripheral portion extends along the one of the two skins so as to delimit at least one portion of at least one first cell.

4. The panel according to claim 1, wherein for one or several fibrous folds the first peripheral portion extends along the one of the two skins so as to delimit at least one portion of at least one of the cells, and the pair of second peripheral portions extend along the other one of the two skins so as to delimit at least one portion of the same at least one of the cells.

5. The panel according to claim 1, wherein the fibrous folds comprise fibers of a ceramic material.

6. The panel according to claim 1, wherein the fibrous folds are textile folds.

7. A component of an exhaust nozzle or of a nacelle of an aircraft propulsion assembly, wherein the component comprises the panel according to claim 1.

8. The panel according to claim 1, wherein the fibrous folds form a one-piece component.

9. The panel according to claim 1, wherein at least some of the fibrous folds are integrally manufactured by draping textile folds on a plurality of molds having a shape conforming to a shape of the plurality of cells, followed by extracting the plurality of molds.

* * * * *